United States Patent
Rudnik et al.

(10) Patent No.: US 11,283,763 B2
(45) Date of Patent: Mar. 22, 2022

(54) ON-DEVICE DYNAMIC SAFE BROWSING

(71) Applicant: McAfee, LLC, San Jose, CA (US)

(72) Inventors: Lior Rudnik, San Jose, CA (US);
Mykhaylo Melnyk, Waterloo (CA)

(73) Assignee: McAfee, LLC, San Jose, CA (US)

( * ) Notice: Subject to any disclaimer, the term of this patent is extended or adjusted under 35 U.S.C. 154(b) by 129 days.

(21) Appl. No.: 16/236,195

(22) Filed: Dec. 28, 2018

(65) Prior Publication Data

US 2020/0213277 A1 Jul. 2, 2020

(51) Int. Cl.
*H04L 29/06* (2006.01)
*H04L 12/46* (2006.01)
*H04L 61/5007* (2022.01)
*H04L 61/4511* (2022.01)

(52) U.S. Cl.
CPC ...... *H04L 63/0236* (2013.01); *H04L 12/4641* (2013.01); *H04L 61/1511* (2013.01); *H04L 61/2007* (2013.01); *H04L 63/0272* (2013.01)

(58) Field of Classification Search
CPC .................. H04L 63/0236; H04L 12/4641
USPC ........................................................... 726/15
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,460,050 B1 | 10/2002 | Pace et al. |
| 7,506,155 B1 | 3/2009 | Stewart et al. |
| 8,156,199 B1 * | 4/2012 | Hoche-Mong ...... H04L 63/0272 709/218 |
| 8,549,617 B2 | 10/2013 | Wei et al. |
| 8,745,691 B1 | 6/2014 | Vassilev |
| 8,935,748 B2 | 1/2015 | Statia et al. |
| 9,467,421 B2 | 10/2016 | Xie |
| 10,567,362 B2 | 2/2020 | Oxford et al. |
| 2002/0093915 A1 | 7/2002 | Larson |
| 2002/0103931 A1 | 8/2002 | Mott |
| 2003/0041091 A1 | 2/2003 | Cheline et al. |
| 2003/0041136 A1 | 2/2003 | Cheline et al. |

(Continued)

FOREIGN PATENT DOCUMENTS

WO  2017105906 A1  6/2017

OTHER PUBLICATIONS

Chong, K., et al., "Mitigating Man-In-The-Middle Attacks on Mobile Devices by Blocking Insecure HTTP Traffic Without Using VPN," Edith Cowan University; Proceedings of the 16th Australian Information Security Management Conference; 14 pages (2018).

(Continued)

*Primary Examiner* — Anthony D Brown
(74) *Attorney, Agent, or Firm* — Patent Capital Group

(57) ABSTRACT

In an example, there is disclosed a computing apparatus, including: a hardware platform comprising a processor and a memory; software to access a network or internet resource according to a domain name; a network stack to provide network or internet access; and a virtual private network (VPN), configured to locally intercept a domain name-based access request, query a domain policy repository to determine whether the domain name should be blocked, and to query an external domain name system (DNS) server for an internet protocol (IP) address for the domain name and pass the request through the network stack if the domain name should not be blocked.

20 Claims, 9 Drawing Sheets

(56) References Cited

U.S. PATENT DOCUMENTS

| | | |
|---|---|---|
| 2003/0055990 A1 | 3/2003 | Cheline et al. |
| 2003/0177395 A1 | 9/2003 | Pardee et al. |
| 2003/0219022 A1 | 11/2003 | Dillon et al. |
| 2006/0031407 A1 | 2/2006 | Dispensa et al. |
| 2009/0031028 A1 | 1/2009 | Kumar et al. |
| 2009/0055929 A1 | 2/2009 | Lee et al. |
| 2012/0008554 A1* | 1/2012 | Kim ............... H04W 76/12 370/328 |
| 2012/0185942 A1 | 7/2012 | Dixon et al. |
| 2013/0097710 A1 | 4/2013 | Basavapatna et al. |
| 2013/0152156 A1 | 6/2013 | Allison et al. |
| 2015/0052599 A1 | 2/2015 | Champagne et al. |
| 2016/0261564 A1 | 9/2016 | Foxhoven et al. |
| 2016/0277359 A1 | 9/2016 | Karunakaran et al. |
| 2016/0330173 A1 | 11/2016 | Rene |
| 2016/0337104 A1 | 11/2016 | Kalligudd |
| 2017/0005938 A1 | 1/2017 | Rimola |
| 2017/0054761 A1* | 2/2017 | Schryver ............ H04L 61/1511 |
| 2017/0063798 A1 | 3/2017 | Lapidous |
| 2017/0093824 A1 | 3/2017 | Shulman et al. |
| 2017/0339729 A1 | 11/2017 | Szabo et al. |
| 2018/0131719 A1 | 5/2018 | Amit et al. |
| 2018/0145950 A1 | 5/2018 | Tabares |
| 2018/0270201 A1 | 9/2018 | Chanak et al. |
| 2018/0295134 A1 | 10/2018 | Gupta et al. |
| 2019/0097970 A1 | 3/2019 | Coleman et al. |
| 2020/0252376 A1 | 8/2020 | Feng et al. |
| 2020/0313929 A1 | 10/2020 | Rudnik |
| 2020/0314067 A1 | 10/2020 | Rudnik |

OTHER PUBLICATIONS

Song, Y., et al., "Privacy Guard: A VPN-based Platform to Detect Information Leakage on Android Devices," SPSM'15: Proceedings of the 5th Annual ACM CCS Workshop on Security and Privacy in Smartphones and Mobile Devices; 12 pages (Oct. 12, 2015).

* cited by examiner

ON-DEVICE DYNAMIC SAFE BROWSING

FIELD OF THE SPECIFICATION

This disclosure relates in general to the field of content filtering, and more particularly, though not exclusively to, a system and method for providing on-device dynamic safe browsing.

BACKGROUND

Modern computers often have always-on internet connections. Such connections can provide multiple vectors for security threats to attack a system.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
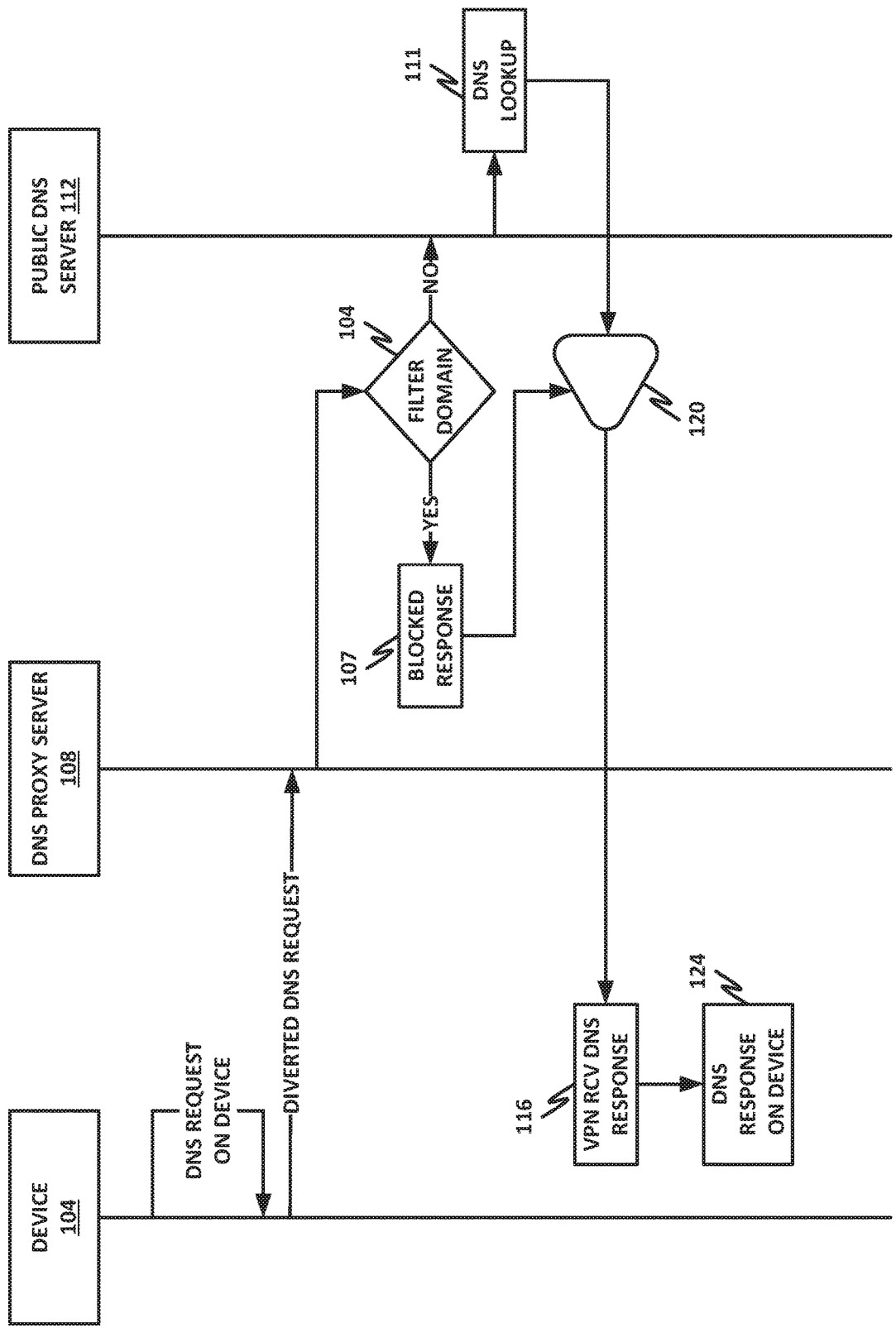
FIG. 1 is a signal flow diagram illustrating a domain name system (DNS) proxy lookup.

There is disclosed in one example a computing apparatus, comprising: a hardware platform comprising a processor and a memory; software to access a network or internet resource according to a domain name; a network stack to provide network or internet access; and a virtual private network (VPN), configured to locally intercept a domain name-based access request, query a domain policy repository to determine whether the domain name should be blocked, and to query an external domain name system (DNS) server for an internet protocol (IP) address for the domain name and pass the request through the network stack if the domain name should not be blocked.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A common concern for enterprises, families, individuals, and other computer users is the filtering of websites that are considered risky, unsafe, or otherwise undesirable. One method of ensuring that computer users do not encounter websites that they should not is so-called common safe browsing or content filtering. Content filtering can rely on diverting domain name system (DNS) lookup requests from the user's local device to a DNS proxy server. The DNS proxy server can implement preset filtering according to user or enterprise demands. This occurs when a user attempts to navigate to a website, and the standard DNS request is diverted to the proxy server. The DNS proxy server checks the domain name against a list of domain names that are risky or against policy, and depending on the result, either returns the address of the requested domain, or returns the address of an error page that informs the user that access to that website has been blocked.

Because common safe browsing or content filtering relies on the standard DNS protocol, it is difficult to add additional information to the response to a DNS request. This means it is difficult to provide additional parameters to influence the filtering decision. For example, content filtering makes it difficult to provide user-specific requirements to the filtering logic.

Another disadvantage of standard content filtering is that a user who performs a hypertext transport secure (HTTPS) query must rely on a secure socket layer (SSL) or transport layer security (TLS). When the proxy DNS server determines whether the domain should be blocked or filtered, it provides the internet protocol (IP) address of a so-called "block domain name" server, rather than the actual domain IP. Because SSL and TLS rely on certificates that ensure that the resolved IP address matches the target IP address, redirecting an HTTPS query can result in confusion for the user. When the IP address is redirected, the TLS system sees it as a possible attempt to intercept the request by a bad actor intermediary. The user may therefore receive an error message indicating that the domain name may have been compromised by a third-party intermediary. This can lead to confusion, where the user believes that there is a serious security issue when, in fact, there is none. It's simply a matter of the user trying to access a blocked domain name. Furthermore, because most web browsers will not display the non-matching page for the address that has been resolved, the user may not be aware that the IP address is blocked, because he or she sees only the security warning. Rather, the user may be led to believe that a "man in the middle" attack has occurred.

From the user perspective, this results in a bad experience as the user is unaware of the policy issue, and is aware only that there may be a security issue. The nature of current DNS proxy communications and of TLS provide no current way to override this behavior.

The present specification illustrates a system and method for providing localized DNS proxying that avoids the issue of false security warnings, and other issues associated with remote DNS proxies. According to the teachings of the present specification, filtering can be dynamically changed, based on information available on the device. This also provides the ability to deal much better with HTTPS, offering the possibility for user overrides when required.

Furthermore, the solution discussed herein reduces maintenance, effort, and cost by eliminating some intermediary server systems.

Embodiments of the present specification provide an on-device DNS filtering service with dynamic decisions made on the device with contextual information from the device. This means that an external DNS proxy is not necessary. Because the DNS proxy resides on the device, it can observe all DNS communications within the device. This provides a dynamic filtering capability, and supports user override options and a better user experience for blocked domains when using HTTPS. Embodiments of the present specification employ a limited virtual private network (VPN) on the device. This limited VPN provides only DNS services, and with a successful DNS lookup, otherwise seamlessly and invisibly handles all traffic through the ordinary network stack. The limited VPN is intelligent enough to know when a DNS lookup fails because it resolves to domain name that is blocked by policy. Note that the list of domain names blocked by policy can still be maintained offline, or in an enterprise policy server, although the list can also be maintained on the device. In some cases, the device periodically synchronizes with an enterprise policy server. The list of blocked domain names may be stored in a secure and encrypted location to avoid tampering by the end user.

The VPN of the present specification solves a drawback of existing solutions that are unable to implement a dynamic decision based on the user profile or additional user-related properties or context. It also solves a drawback of existing solutions when HTTPS is involved, which is increasingly common because many websites have moved to an HTTPS model. The VPN also proves maintainability because there is no server to maintain, thus saving costs for servers and appliances.

An embodiment of the present specification includes a two-layer solution. A VPN client implementation diverts DNS traffic in such a way that it does not go out to a server, while simulating the existence of a VPN server to the operating system (OS). The second layer includes DNS packet inspection and alteration of responses back to the OS, based on dynamic filtering decision logic.

The custom VPN client site implementation may be configured as a split tunnel, which routes only the DNS server IPs as defined in the system. The VPN's own DNS server may be specified to reside inside its routing range, as well as its remote server IP. This forces all DNS traffic on the device to be diverted into the VPN client, which directs all DNS outgoing flow back to itself. This loop configuration enables the VPN to intercept the DNS IP packets as they are sent from the OS. The VPN can modify DNS responses back to the OS as necessary.

Once a DNS packet is received, it is parsed to extract the domain. Filtering logic is then used to decide if the DNS request should be filtered or not. If the decision is to filter, a DNS reply is constructed with the known IP of a filtering service, and fed back to the OS. If the decision is not to filter, the request is forwarded to a public DNS server. The response is obtained and fed back to the OS. The response may be modified if necessary.

For example, a threat intelligence service representational state transfer (REST) application program interface (API) may be used to check the domain and receive a classification. Based on the classification and the available user profile rules, a decision can be made whether the domain should be blocked for this particular user. In some cases, a global service such as MCAFEE, LLC's Global Threat Intelligence (GTI) or a similar service may be used. This can be used in conjunction with user preferences, administrative overrides, or other protocols to determine whether and when an IP address should be blocked.

A system and method for providing on-device dynamic safe browsing will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a signal flow diagram illustrating a domain name system (DNS) proxy lookup. The DNS proxy lookup of FIG. 1 illustrates a method commonly used in existing systems. In some cases, the flow of FIG. 1 may be used in conjunction with the teachings of the present specification, such as in a hybrid system or similar.

The flow diagram of FIG. 1 includes a local device 104, a DNS proxy server 108, and a public DNS server 112.

When a user of local device 104 wants to visit a website, the user may, for example, enter the website into the address bar of a browser, or click on a link. This causes a DNS request to be generated on the device. According to an enterprise, family, or personal policy, device 104 may have configured DNS servers that point to DNS proxy server 108, which includes a DNS policy such as to block certain domain names. Thus, a diverted DNS request is passed to DNS proxy server 108. DNS proxy server 108 then determines in decision block 104 whether the domain should be blocked or otherwise redirected. This can include, for example, querying a list of domain names that should be filtered. This could be either an absolute list, or it could be a contextual, per-user, or per-subscriber list, which enables the configuration of enterprise or user policies that are different from user to user. For example, there are some web services that allow a user to sign up with an account, and then indicate which websites he would like to block for his family. With all of the family's computers then set to resolve to the DNS proxy server 108, DNS proxy server 108 can look at a customized list for that subscriber, to determine which websites are blocked and which are not.

If the website is not blocked, or the domain is not filtered, then the request is forwarded to a public DNS server 112, which performs a DNS lookup 111. This returns an IP address to IP forwarding block 120.

Returning to decision block 104, if the response is to be blocked, then in block 107, DNS proxy server 108 generates a blocked response. Blocked response 107 may include the IP address of a "blocked" webpage that informs the user that the address he or she is trying to access is blocked. This is provided to forwarding block 120.

Forwarding block 120 provides the IP address to device 104. In block 116, the VPN on device 104 receives the DNS response. This is then provided as DNS response 124 on the device.

Depending on the nature of the returned IP address, the user will either access the actual website that he or she requested, or the user will access a page indicating that the requested website has been blocked.

As described above, if the DNS request was redirected to a blocked website page, this can appear to the HTTPS processing system like a man in the middle attack where the request was intercepted and a false webpage was served up. Thus, rather than navigating to the blocked website page, the user may simply be presented with a security error indicating that there is a problem with the website certificate. This can cause confusion for the user, and provide a suboptimal user experience.

Figure 2:
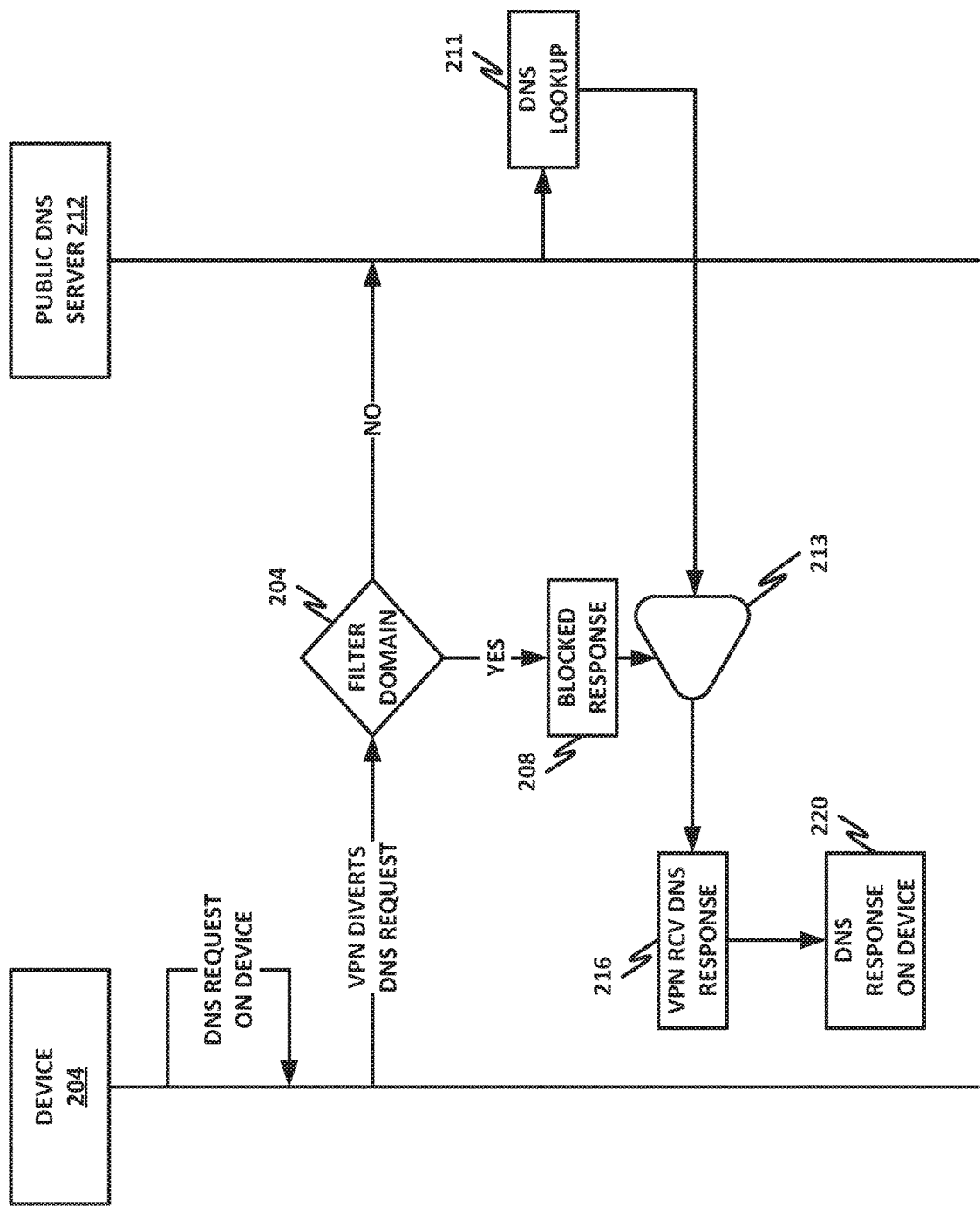
FIG. 2 is a signal flow diagram illustrating the use of a local limited DNS virtual private network (VPN).

FIG. 2 is a signal flow diagram illustrating an alternative embodiment, wherein a DNS proxy server is not used, but rather a local limited DNS VPN is used on the local device.

As before, when the user tries to navigate to a webpage, device 204 generates a local DNS request on the device. This DNS request is provided to the local on-device VPN, which diverts the DNS request to a localized DNS proxy.

In decision block 204, the localized DNS proxy determines for itself whether to filter the domain. This could be based on a local list of blocked domains, or it could query an outside service that can provide information similar to the DNS proxy server, such as a list of blocked domains, which may be provided on a per-user or per-subscriber basis. However, the local VPN can also take into account contextual information, such as local user preferences or contextual information about the request, device, time of day, number of requests per time period, or other contextual information. The VPN can provide dynamic decision-making based on properties that can change per each domain query. In some cases, the local VPN may query a global database such as MCAFEE, LLC's GTI or similar, to determine which domain names can be blocked, which again can be determined on a per-user or per-subscriber basis.

If the domain is not to be filtered, then the local VPN queries public DNS server 212, which performs a DNS lookup 211 to find the correct IP address for the resolved domain name. This correct IP address is then provided to forwarding block 213.

If the local VPN determines in decision block 204 that the domain is to be blocked, then it provides blocked response 208 to forwarding block 213. Blocked response 208 may include a static, locally-stored web page (e.g., "This Domain is Blocked"), or the IP address of remotely-hosted webpage indicating that the domain is blocked. The blocked response may also include more intelligent processing. For example, the local VPN may modify the response packet to deal with the HTTPS issue so that the user does not believe that he is visiting a compromised website that may have been subject to a man in the middle attack. This may include, for example, providing additional explanatory information along with the standard HTTPS error response. This helps the user to understand that the HTTPS error is not the result of a man-in-the-middle attack, but rather the result of redirecting the response to the IP address of a "blocked domain" webpage.

Forwarding block 213 provides the DNS response to block 216. This includes a real or a redirected IP address. The DNS response is then provided on the device in block 220. Advantageously, because the DNS proxy VPN is located on the local device 204, it can make intelligent decisions about handling the DNS traffic, and can also modify packets to provide more information and customization for the end user.

Figure 3:
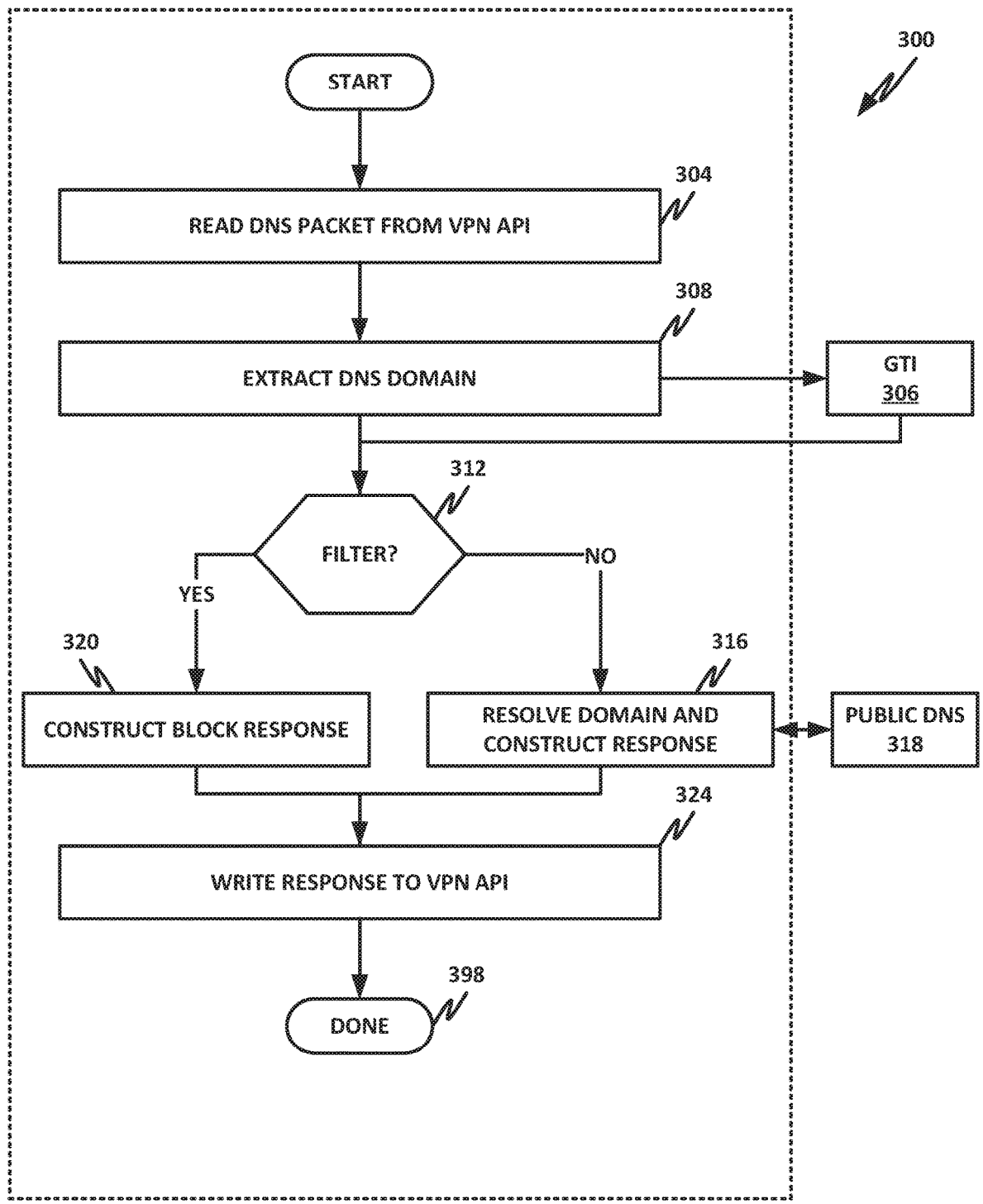
FIG. 3 is a flowchart of a method of providing a localized DNS VPN.

FIG. 3 is a flowchart of a method 300 of providing a localized DNS VPN. Method 300 may be performed by a local VPN on the local device that is configured to perform DNS proxy services.

In block 304, the VPN reads a DNS packet received on the VPN API. For example, the VPN may be inserted within the lower layers of the TCP/IP stack, and may specifically be inserted so that it can provide DNS lookup services.

In block 308, the VPN extracts the DNS domain to make a decision on whether the domain should be filtered or blocked. This decision can be outsourced to an external entity such as GTI 306 or similar, or it can be performed completely within the VPN. In other cases, there may be a combination of local policy and global policy, and the domain name may be blocked if it is blocked by either policy.

In decision block 312, the VPN determines whether the domain name is to be filtered. As described above, this can be based either on local processing, remote processing, or on a combination of the two.

If the domain name is not to be filtered, then in block 316, the VPN resolves the domain and constructs a response. Constructing the response may include querying a public DNS server 318 to determine the actual IP address of the requested domain. Once the requested response is constructed, then in block 324, the response is written to the VPN API, and can then be passed on to the normal IP stack for the local device.

Returning to block 312, if the domain name is to be filtered, then in block 320, the VPN constructs a "block" response. This indicates that the domain name is to be blocked. This can be a redirect to an external IP address, or it can simply be redirecting to a local page that provides the blocked information. Note that this request can be modified to deal with any HTTPS issues to ensure that the user is not provided with a confusing experience, or led to believe that a man in the middle attack has occurred when, in fact, the domain name has simply been blocked.

The blocked response is written to the VPN API in block 324.

In block 398, the method is done.

Figure 4:
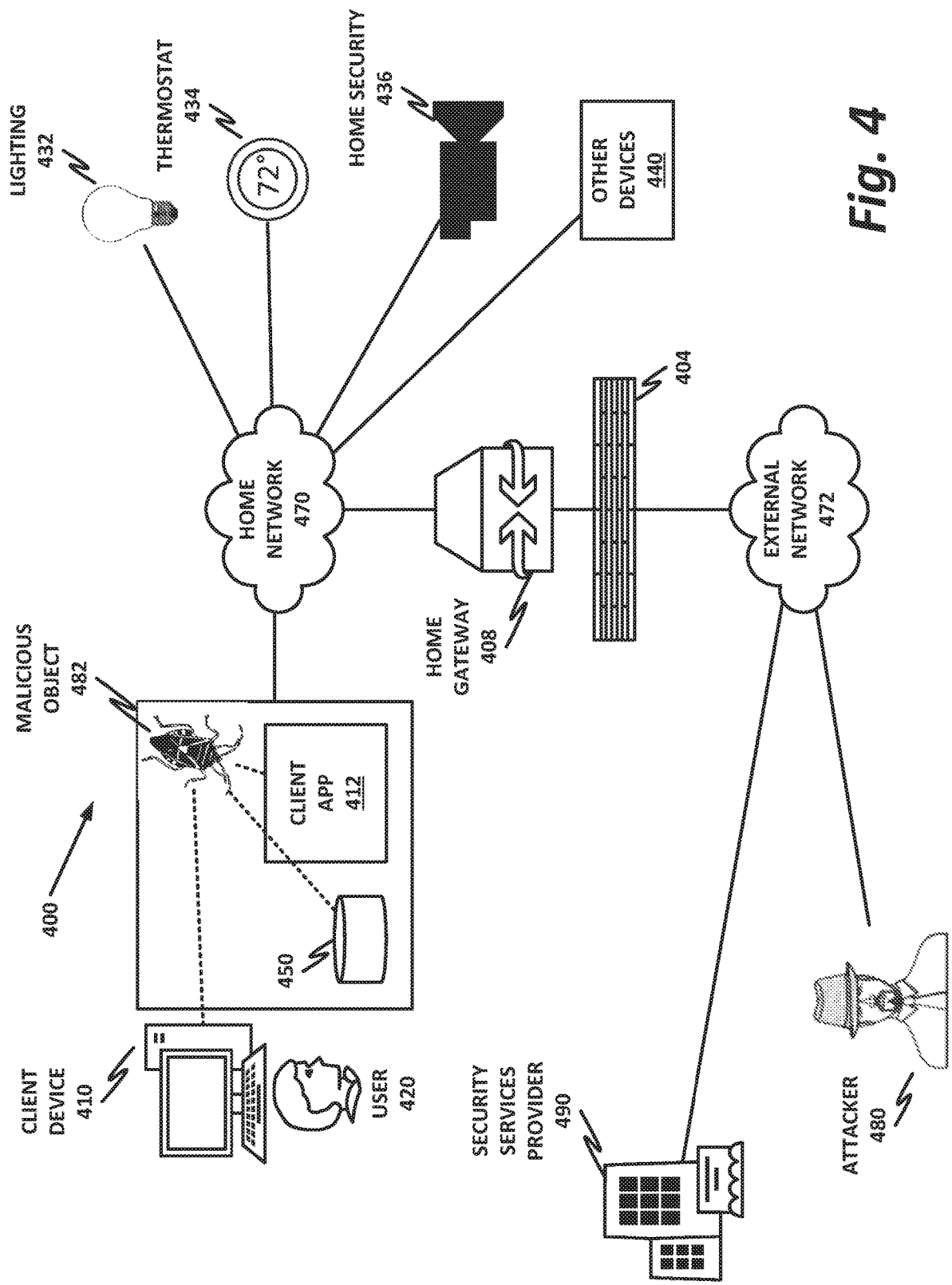
FIG. 4 is a block diagram of a home network.

FIG. 4 is a network-level diagram of a home network 400. Embodiments of home network 400 disclosed herein may be adapted or configured to provide on-device dynamic safe browsing, according to the teachings of the present specification.

In the example of FIG. 4, home network 400 may be a "smart home" with various Internet of things (IoT) devices that provide home automation or other services. Home network 400 is provided herein as an illustrative and non-limiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 400, one or more users 420 operate one or more client devices 410. A single user 420 and single client device 410 are illustrated here for simplicity, but a home or enterprise may have multiple users, each of which may have multiple devices.

Client devices 410 may be communicatively coupled to one another and to other network resources via home network 470. Home network 470 may be any suitable network or combination of one or more networks operating on one or more suitable networking protocols, including a local area network, an intranet, a virtual network, a wide area network, a wireless network, a cellular network, or the internet (optionally accessed via a proxy, virtual machine, or other similar security mechanism) by way of nonlimiting example. Home network 470 may also include one or more servers, firewalls, routers, switches, security appliances, antivirus servers, or other network devices, which may be single-purpose appliances, virtual machines, containers, or functions running on client devices 410.

A prototype implementation of the system of the present specification was provided on an Apple iOS-based device, and thus it should be noted that client device 410 could be a device such as an Apple iPhone. The teachings of this specification are also compatible with Android-based devices, which are used on hardware provided by many different vendors.

In this illustration, home network 470 is shown as a single network for simplicity, but in some embodiments, home network 470 may include any number of networks, such as one or more intranets connected to the internet. Home network 470 may also provide access to an external network, such as the internet, via external network 472. External network 472 may similarly be any suitable type of network.

Home network 470 may connect to the internet via a home gateway 408, which may be responsible, among other things, for providing a logical boundary between home network 472 and external network 470. Home network 470 may also provide services such as dynamic host configuration protocol (DHCP), gateway services, router services, and switching services, and may act as a security portal across home boundary 404.

Home network 400 may also include a number of discrete IoT devices, which in contemporary practice are increasing regularly. For example, home network 400 may include IoT functionality to control lighting 432, thermostats or other environmental controls 434, a home security system 436, and any number of other devices 440. Other devices 440 may include, as illustrative and nonlimiting examples, network-attached storage (NAS), computers, printers, smart televisions, smart refrigerators, smart vacuum cleaners and other appliances, and network connected vehicles.

Home network 400 may communicate across home boundary 404 with external network 472. Home boundary 404 may represent a physical, logical, or other boundary. External network 472 may include, for example, websites, servers, network protocols, and other network-based services. In one example, an attacker 480 (or other similar malicious or negligent actor) also connects to external network 472. A security services provider 490 may provide services to home network 400, such as security software, security updates, network appliances, or similar. For example, MCAFEE, LLC provides a comprehensive suite of security services that may be used to protect home network 400.

It may be a goal of users 420 and home network 400 to successfully operate client devices 410 and IoT devices without interference from attacker 480 or from unwanted security objects. In one example, attacker 480 is a malware author whose goal or purpose is to cause malicious harm or mischief, for example, by injecting malicious object 482 into client device 410. Once malicious object 482 gains access to client device 410, it may try to perform work such as social engineering of user 420, a hardware-based attack on client device 410, modifying storage 450 (or volatile memory), modifying client application 412 (which may be running in memory), or gaining access to home resources. Furthermore, attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 480 to leverage against home network 470.

Malicious harm or mischief may take the form of installing root kits or other malware on client devices 410 to tamper with the system, installing spyware or adware to collect personal and commercial data, defacing websites, operating a botnet such as a spam server, or simply to annoy and harass users 420. Thus, one aim of attacker 480 may be to install his malware on one or more client devices 410 or any of the IoT devices described. As used throughout this specification, malicious software ("malware") includes any security object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 480 may also want to commit industrial or other espionage, such as stealing classified or proprietary data, stealing identities, or gaining unauthorized access to enterprise resources. Thus, attacker 480's strategy may also include trying to gain physical access to one or more client devices 410 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 480. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 400 may contract with or subscribe to a security services provider 490, which may provide security services, updates, antivirus definitions, patches, products, and services. MCAFEE, LLC is a nonlimiting example of such a security services provider that offers comprehensive security and antivirus solutions. In some cases, security services provider 490 may include a threat intelligence capability such as the GTI database provided by MCAFEE, LLC. Security services provider 490 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

Figure 5A:
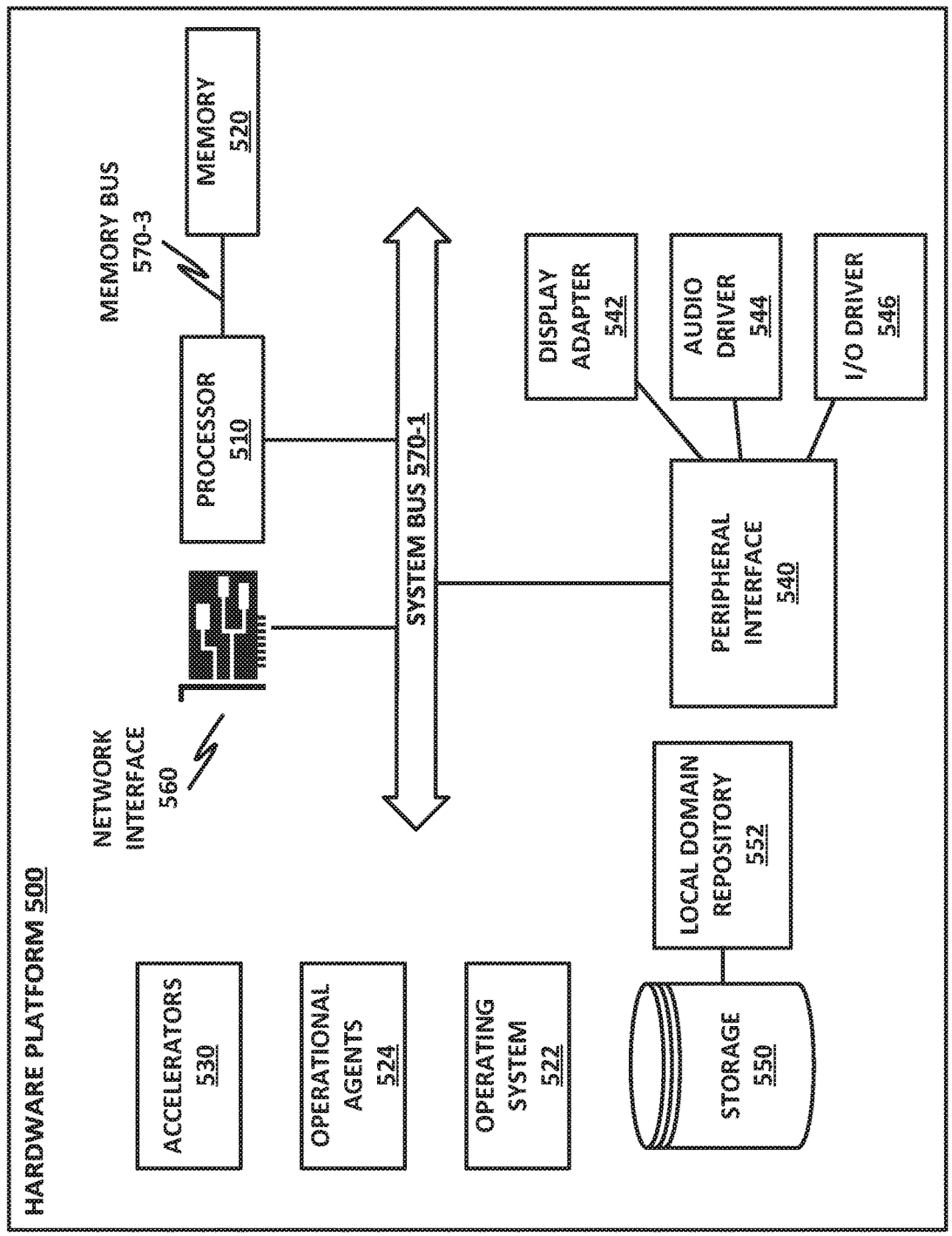
FIG. 5a is a block diagram of a hardware platform.

FIG. 5a is a block diagram of hardware platform 500. Embodiments of hardware platform 500 disclosed herein may be adapted or configured to provide on-device dynamic safe browsing, according to the teachings of the present specification.

Hardware platform 500 may represent any suitable computing device. In various embodiments, a "computing device" may be or comprise, by way of nonlimiting example, a computer, workstation, server, mainframe, virtual machine (whether emulated or on a "bare-metal" hypervisor), network appliance, container, IoT device, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 410, home gateway 408, and the IoT devices illustrated in FIG. 4 may all be examples of devices that run on a hardware platform such as hardware platform 500. FIG. 5 presents a view of many possible elements that may be included in a hardware platform, but it should be understood that not all of these are necessary in every platform, and platforms may also include other elements. For example, peripheral interface 540 may be an essential component in a user-class device to provide input and output, while it may be completely unnecessary in a virtualized server or hardware appliance that communicates strictly via networking protocols.

By way of illustrative example, hardware platform 500 provides a processor 510 connected to a memory 520 and other system resources via one or more buses, such a system bus 570-1 and a memory bus 570-3.

Other components of hardware platform 500 include a storage 550, network interface 560, and peripheral interface 540. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 520 and storage 550, for example, in a single physical memory device, and in other cases, memory 520 and/or storage 550 are functionally distributed across many physical devices. In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 560 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In some cases, particularly embodiments where a blocked domain list or other domain policy is located locally, storage 550 may include a local domain repository 552. This may be maintained by the user, by a mobile device manager, or by other means. In some cases, local domain repository 552 may be periodically updated or reconciled via the network.

In various examples, a "processor" may include any combination of logic elements operable to execute instructions, whether loaded from memory, or implemented directly in hardware, including, by way of nonlimiting example, a microprocessor, digital signal processor, field-programmable gate array, graphics processing unit, programmable logic array, application-specific integrated circuit, or virtual machine processor. In certain architectures, a multi-core processor may be provided, in which case processor 510 may be treated as only one core of a multi-core processor, or may be treated as the entire multi-core processor, as appropriate. In some embodiments, one or more co-processors may also be provided for specialized or support functions.

Processor 510 may be communicatively coupled to devices via a system bus 570-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 570-1 is not so limited, and may include any other type of bus. Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 510 is communicatively coupled to memory 520 via memory bus 570-3, which may be, for example, a direct memory access (DMA) bus, though other memory architectures are possible, including ones in which memory 520 communicates with processor 510 via system bus 570-1 or some other bus. In the same or an alternate embodiment, memory bus 570-3 may include remote direct memory access (RDMA), wherein processor 510 accesses disaggregated memory resources via DMA or DMA-like interfaces.

To simplify this disclosure, memory 520 is disclosed as a single logical block, but in a physical embodiment may include one or more blocks of any suitable volatile or nonvolatile memory technology or technologies, including, for example, double data rate random-access memory (DDR RAM), static random-access memory (SRAM), dynamic random-access memory (DRAM), persistent random-access memory (PRAM), or other similar persistent fast memory, cache, Layer 1 (L1) or Layer 2 (L2) memory, on-chip memory, registers, flash, read-only memory (ROM), optical media, virtual memory regions, magnetic or tape memory, or similar. In certain embodiments, memory 520 may comprise a relatively low-latency volatile main memory, while storage 550 may comprise a relatively higher-latency nonvolatile memory. However, memory 520 and storage 550 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 550 may be any species of memory 520, or may be a separate device. Storage 550 may include one or more non-transitory computer-readable mediums, including, by way of nonlimiting example, a hard drive, solid-state drive, external storage, microcode, hardware instructions, redundant array of independent disks (RAID), NAS, optical storage, tape drive, backup system, cloud storage, or any combination of the foregoing. Storage 550 may be, or may include therein, a database or databases or data stored in other configurations, and may include a stored copy of operational software such as operating system 522 and software portions, if any, of operational agents 524, accelerators 530, or other engines. Many other configurations are also possible, and are intended to be encompassed within the broad scope of this specification.

As necessary, hardware platform 500 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 500 may be configured for virtualization or containerization, in which case it may also provide a hypervisor, virtualization platform, virtual machine manager (VMM), orchestrator, containerization platform, or other infrastructure to provide flexibility in allocating resources.

Network interface 560 may be provided to communicatively couple hardware platform 500 to a wired or wireless network or fabric. A "network," as used throughout this specification, may include any communicative platform operable to exchange data or information within or between computing devices, including, by way of nonlimiting example, a local network, a switching fabric, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Operational agents 524 are one or more computing engines that may include one or more non-transitory computer-readable mediums having stored thereon executable instructions operable to instruct a processor to provide operational functions. At an appropriate time, such as upon booting hardware platform 500 or upon a command from operating system 522 or a user or security administrator, processor 510 may retrieve a copy of operational agents 524 (or software portions thereof) from storage 550 and load it into memory 520. Processor 510 may then iteratively execute the instructions of operational agents 524 to provide the desired methods or functions.

As used throughout this specification, an "engine" includes any combination of one or more logic elements, of similar or dissimilar species, operable for and configured to perform one or more methods provided by the engine. In some cases, the engine may include a special integrated circuit designed to carry out a method or a part thereof, a field-programmable gate array (FPGA) programmed to provide a function, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware and software, including configuration files, registry entries, application programming interfaces (APIs), and interactive or user-mode software by way of nonlimiting example.

Peripheral interface 540 may be configured to interface with any auxiliary device that connects to hardware platform 500 but that is not necessarily a part of the core architecture of hardware platform 500. A peripheral may be operable to provide extended functionality to hardware platform 500, and may or may not be wholly dependent on hardware platform 500. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 542, audio driver 544, and input/output (I/O) driver 546. Display adapter 542 may be configured to provide a human-readable visual output, such as a command-line interface (CLI) or graphical desktop such as Microsoft Windows, Apple OSX desktop, or a Unix/Linux X Window System-based desktop. Display adapter 542 may provide output in any suitable format, such as a coaxial output, composite video, component video, video graphics array (VGA), or digital outputs such as digital visual interface (DVI) or high definition multimedia interface (HDMI), by way of nonlimiting example. In some examples, display adapter 542 may include a hardware graphics card, which may have its own memory and its own graphics processing unit (GPU). Audio driver 544 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

Figure 5B:
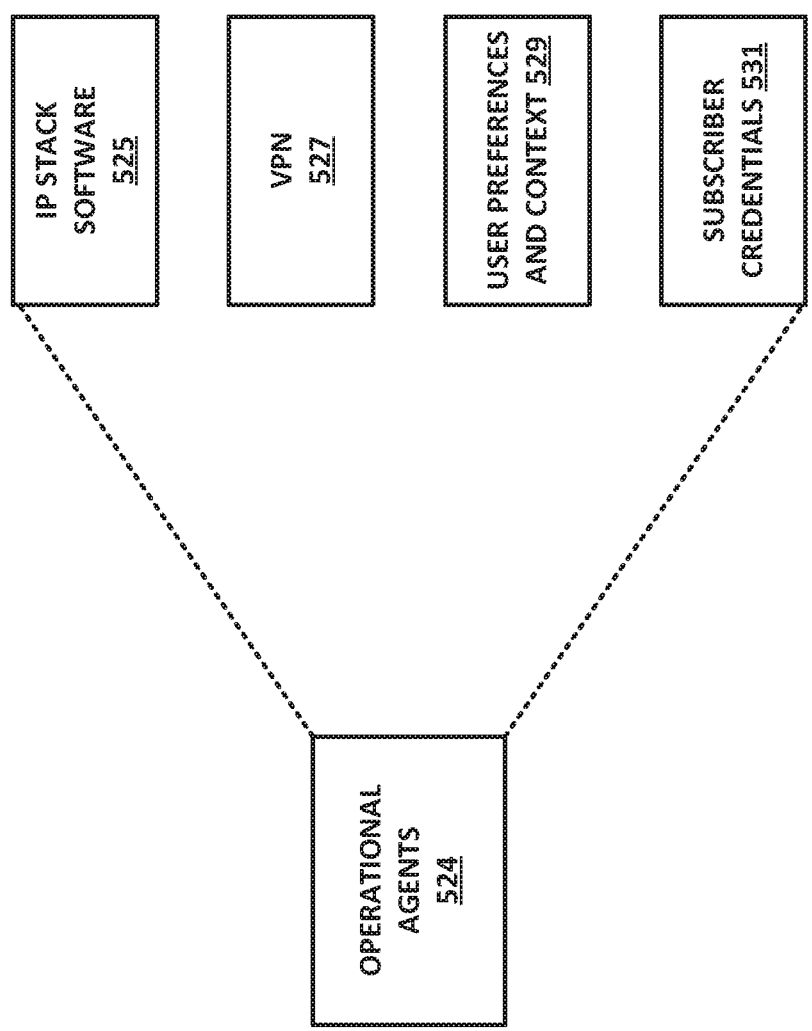
FIG. 5b is a block diagram illustrating examples of operational agents.

FIG. 5b is a block diagram illustrating examples of operational agents that may be provided in one or more embodiments.

In this case, operational agents include IP software stack 525, VPN 527, user preferences and context 529, and subscriber credentials 531.

IP software stack 525 may provide at least software portions a traditional network protocol stack, such as the seven-layer stack of the Open Software Initiative (OSI) model or the seven-layer transmission control protocol/internet protocol (TCP/IP) stack.

VPN 527 may intercept packets at lower layers of the protocol stack, for example at layer 4, though this is provided as a nonlimiting example only. At the intercepted layer, VPN 527 inspects the domain name for the requested resource, and checks the domain name against a domain repository, which may be local or remote. This may include, in some cases, querying user preferences and context 529 to determine whether the domain should be blocked.

In cases where an external service is to be consulted, it could be a simple universal query. For example, an enterprise may have a master list of blocked domains, which are applied to all users. In other embodiments, user-specific credentials or subscriber credentials may be provided to the external service, so that the external service can determine whether a website should be blocked for the specific user or subscriber.

Figure 6:
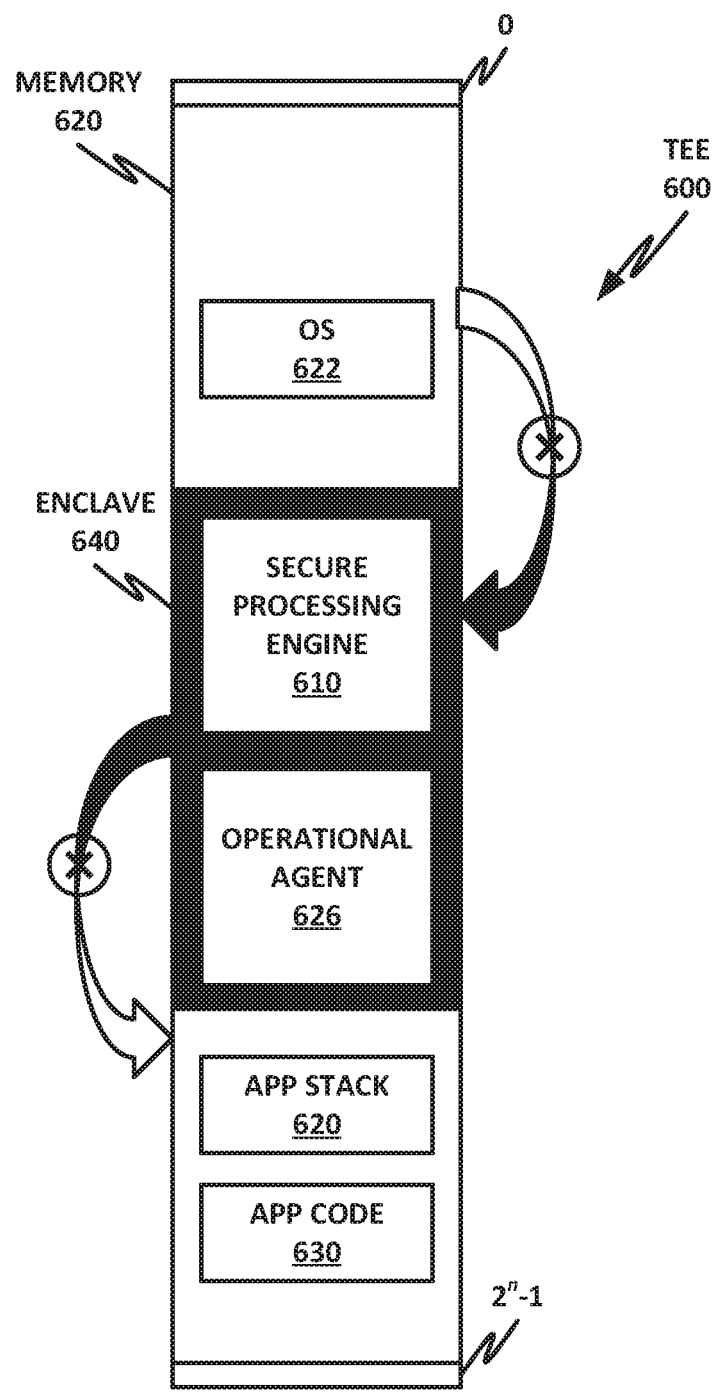
FIG. 6 illustrates a trusted execution environment (TEE).

FIG. 6 illustrates a trusted execution environment (TEE) 600. Embodiments of TEE 600 disclosed herein may be adapted or configured to provide on-device dynamic safe browsing, according to the teachings of the present specification. For example, a TEE could be used to securely host a VPN. This additional security may be desirable in some embodiments, particularly because the VPN may interfere with the HTTPS protocol for blocked websites.

In the example of FIG. 6, memory 620 is addressable by n-bits, ranging in address from 0 to $2^n-1$ (note however that in many cases, the size of the address space may far exceed the actual memory available). Within memory 620 is an OS 622, enclave 640, application stack 620, and application code 630.

In this example, enclave 640 is a specially-designated portion of memory 620 that cannot be entered into or exited from except via special instructions, such as Intel® Software Guard Extensions (SGX™) or similar. Enclave 640 is provided as an example of a secure environment which, in conjunction with a secure processing engine 610, forms a TEE 600 on a hardware platform such as platform 500 of FIG. 5. A TEE 600 is a combination of hardware, software, and/or memory allocation that provides the ability to securely execute instructions without interference from outside processes, in a verifiable way. By way of example, TEE 600 may include memory enclave 640 or some other protected memory area, and a secure processing engine 610, which includes hardware, software, and instructions for accessing and operating on enclave 640. Nonlimiting examples of solutions that either are or that can provide a TEE include Intel® SGX™, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 610 may be a user-mode application that operates via trusted execution framework 524 within enclave 640. TEE 600 may also conceptually include processor instructions that secure processing engine 610 and trusted execution framework 524 require to operate within enclave 640.

Secure processing engine 610 and trusted execution framework 524 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 622 may be excluded from TCB, in addition to the regular application stack 620 and application code 630.

In certain systems, computing devices equipped with Intel® SGX™ or equivalent instructions may be capable of providing an enclave 640. It should be noted, however, that many other examples of TEEs are available, and TEE 600 is provided only as one example thereof. Other secure environments may include, by way of nonlimiting example, a virtual machine, sandbox, testbed, test machine, or other similar device or method for providing a TEE 600.

In an example, enclave 640 provides a protected memory area that cannot be accessed or manipulated by ordinary computer instructions. Enclave 640 is described with particular reference to an Intel® SGX™ enclave by way of example, but it is intended that enclave 640 encompass any secure processing area with suitable properties, regardless of whether it is called an "enclave."

One feature of an enclave is that once an enclave region 640 of memory 620 is defined, as illustrated, a program pointer cannot enter or exit enclave 640 without the use of special enclave instructions or directives, such as those provided by Intel® SGX™ architecture. For example, SGX™ processors provide the ENCLU[EENTER], ENCLU[ERESUME], and ENCLU[EEXIT]. These are the only instructions that may legitimately enter into or exit from enclave 640.

Thus, once enclave 640 is defined in memory 520, a program executing within enclave 640 may be safely verified to not operate outside of its bounds. This security feature means that secure processing engine 610 is verifiably local to enclave 640. Thus, when an untrusted packet provides its content to be rendered with trusted execution framework 524 of enclave 640, the result of the rendering is verified as secure.

Enclave 640 may also digitally sign its output, which provides a verifiable means of ensuring that content has not been tampered with or modified since being rendered by secure processing engine 610. A digital signature provided by enclave 640 is unique to enclave 640 and is unique to the hardware of the device hosting enclave 640.

Figure 7:
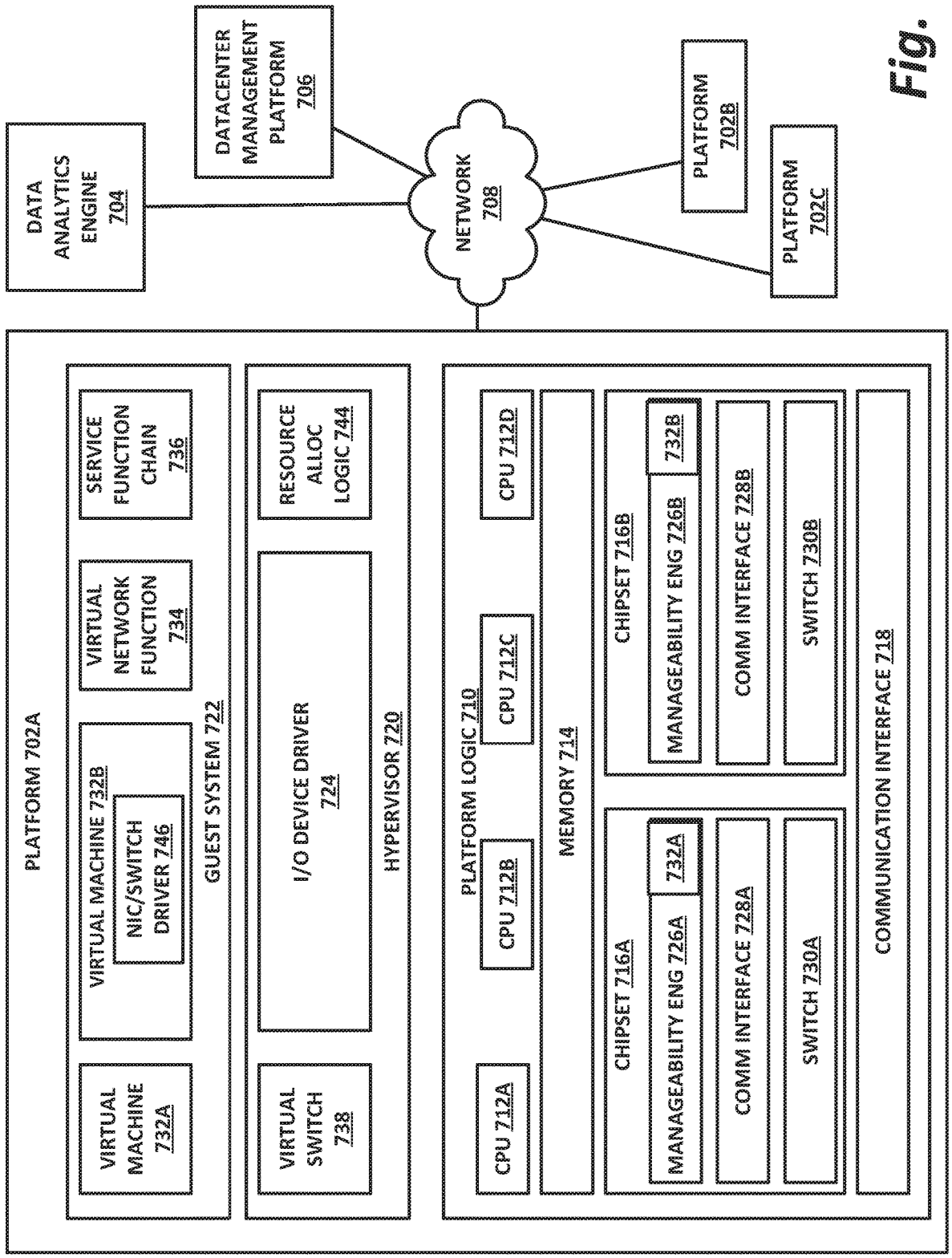
FIG. 7 is a block diagram of components of a computing platform.

FIG. 7 is a block diagram of components of a computing platform 702A. Embodiments of platform 702A disclosed herein may be adapted or configured to provide on-device dynamic safe browsing, according to the teachings of the present specification.

In the embodiment depicted, platforms 702A, 702B, and 702C, along with a data center management platform 706 and data analytics engine 704 are interconnected via network 708. In other embodiments, a computer system may include any suitable number (i.e., one or more) of platforms. In some embodiments (e.g., when a computer system only includes a single platform), all or a portion of the system management platform 706 may be included on a platform 702. A platform 702 may include platform logic 710 with one or more central processing units (CPUs) 712, memories 714 (which may include any number of different modules), chipsets 716, communication interfaces 718, and any other suitable hardware and/or software to execute a hypervisor 720 or other operating system capable of executing workloads associated with applications running on platform 702.

In some embodiments, a platform 702 may function as a host platform for one or more guest systems 722 that invoke these applications. Platform 702A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an IoT environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 706, hypervisor 720, or other operating system) of computer platform 702A may assign hardware resources of platform logic 710 to perform workloads in accordance with the stress information. In some embodiments, self-diagnostic capabilities may be combined with the stress monitoring to more accurately determine the health of the hardware resources. Each platform 702 may include platform logic 710. Platform logic 710 comprises, among other logic enabling the functionality of platform 702, one or more CPUs 712, memory 714, one or more chipsets 716, and communication interfaces 728. Although three platforms are illustrated, computer platform 702A may be interconnected with any suitable number of platforms. In various embodiments, a platform 702 may reside on a circuit board that is installed in a chassis, rack, or other suitable structure that comprises multiple platforms coupled together through network 708 (which may comprise, e.g., a rack or backplane switch).

CPUs 712 may each comprise any suitable number of processor cores and supporting logic (e.g., uncores). The cores may be coupled to each other, to memory 714, to at least one chipset 716, and/or to a communication interface 718, through one or more controllers residing on CPU 712 and/or chipset 716. In particular embodiments, a CPU 712 is embodied within a socket that is permanently or removably coupled to platform 702A. Although four CPUs are shown, a platform 702 may include any suitable number of CPUs.

Memory 714 may comprise any form of volatile or nonvolatile memory including, without limitation, magnetic media (e.g., one or more tape drives), optical media, RAM, ROM, flash memory, removable media, or any other suitable local or remote memory component or components. Memory 714 may be used for short, medium, and/or long term storage by platform 702A. Memory 714 may store any suitable data or information utilized by platform logic 710, including software embedded in a computer-readable medium, and/or encoded logic incorporated in hardware or otherwise stored (e.g., firmware). Memory 714 may store data that is used by cores of CPUs 712. In some embodiments, memory 714 may also comprise storage for instructions that may be executed by the cores of CPUs 712 or other processing elements (e.g., logic resident on chipsets 716) to provide functionality associated with the manageability engine 726 or other components of platform logic 710. A platform 702 may also include one or more chipsets 716 comprising any suitable logic to support the operation of the CPUs 712. In various embodiments, chipset 716 may reside on the same die or package as a CPU 712 or on one or more different dies or packages. Each chipset may support any suitable number of CPUs 712. A chipset 716 may also include one or more controllers to couple other components of platform logic 710 (e.g., communication interface 718 or memory 714) to one or more CPUs. In the embodiment depicted, each chipset 716 also includes a manageability engine 726. Manageability engine 726 may include any suitable logic to support the operation of chipset 716. In a particular embodiment, a manageability engine 726 (which may also be referred to as an innovation engine) is capable of collecting real-time telemetry data from the chipset 716, the CPU(s) 712 and/or memory 714 managed by the chipset 716, other components of platform logic 710, and/or various connections between components of platform logic 710. In various embodiments, the telemetry data collected includes the stress information described herein.

In various embodiments, a manageability engine 726 operates as an out-of-band asynchronous compute agent which is capable of interfacing with the various elements of platform logic 710 to collect telemetry data with no or minimal disruption to running processes on CPUs 712. For example, manageability engine 726 may comprise a dedicated processing element (e.g., a processor, controller, or other logic) on chipset 716, which provides the functionality of manageability engine 726 (e.g., by executing software instructions), thus conserving processing cycles of CPUs 712 for operations associated with the workloads performed by the platform logic 710. Moreover, the dedicated logic for the manageability engine 726 may operate asynchronously with respect to the CPUs 712 and may gather at least some of the telemetry data without increasing the load on the CPUs.

A manageability engine 726 may process telemetry data it collects (specific examples of the processing of stress information will be provided herein). In various embodiments, manageability engine 726 reports the data it collects and/or the results of its processing to other elements in the computer system, such as one or more hypervisors 720 or other operating systems and/or system management software (which may run on any suitable logic such as system management platform 706). In particular embodiments, a critical event such as a core that has accumulated an excessive amount of stress may be reported prior to the normal interval for reporting telemetry data (e.g., a notification may be sent immediately upon detection).

Additionally, manageability engine 726 may include programmable code configurable to set which CPU(s) 712 a particular chipset 716 will manage and/or which telemetry data will be collected.

Chipsets 716 also each include a communication interface 728. Communication interface 728 may be used for the communication of signaling and/or data between chipset 716 and one or more I/O devices, one or more networks 708, and/or one or more devices coupled to network 708 (e.g., system management platform 706). For example, communication interface 728 may be used to send and receive network traffic such as data packets. In a particular embodiment, a communication interface 728 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 716 (e.g., manageability engine 726 or switch 730) and another device coupled to network 708. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 728 may allow communication of data (e.g., between the manageability engine 726 and the data center management platform 706) associated with management and monitoring functions performed by manageability engine 726. In various embodiments, manageability engine 726 may utilize elements (e.g., one or more NICs) of communication interfaces 728 to report the telemetry data (e.g., to system management platform 706) in order to reserve usage of NICs of communication interface 718 for operations associated with workloads performed by platform logic 710.

Switches 730 may couple to various ports (e.g., provided by NICs) of communication interface 728 and may switch data between these ports and various components of chipset 716 (e.g., one or more Peripheral Component Interconnect Express (PCIe) lanes coupled to CPUs 712). Switches 730 may be a physical or virtual (i.e., software) switch.

Platform logic 710 may include an additional communication interface 718. Similar to communication interfaces 728, communication interfaces 718 may be used for the communication of signaling and/or data between platform logic 710 and one or more networks 708 and one or more devices coupled to the network 708. For example, communication interface 718 may be used to send and receive network traffic such as data packets. In a particular embodiment, communication interfaces 718 comprise one or more physical NICs. These NICs may enable communication between any suitable element of platform logic 710 (e.g., CPUs 712 or memory 714) and another device coupled to network 708 (e.g., elements of other platforms or remote computing devices coupled to network 708 through one or more networks).

Platform logic 710 may receive and perform any suitable types of workloads. A workload may include any request to utilize one or more resources of platform logic 710, such as one or more cores or associated logic. For example, a workload may comprise a request to instantiate a software component, such as an I/O device driver 724 or guest system 722; a request to process a network packet received from a virtual machine 732 or device external to platform 702A (such as a network node coupled to network 708); a request to execute a process or thread associated with a guest system 722, an application running on platform 702A, a hypervisor 720 or other operating system running on platform 702A; or other suitable processing request.

A virtual machine 732 may emulate a computer system with its own dedicated hardware. A virtual machine 732 may run a guest operating system on top of the hypervisor 720. The components of platform logic 710 (e.g., CPUs 712, memory 714, chipset 716, and communication interface 718) may be virtualized such that it appears to the guest operating system that the virtual machine 732 has its own dedicated components.

A virtual machine 732 may include a virtualized NIC (vNIC), which is used by the virtual machine as its network interface. A vNIC may be assigned a media access control (MAC) address or other identifier, thus allowing multiple virtual machines 732 to be individually addressable in a network.

VNF 734 may comprise a software implementation of a functional building block with defined interfaces and behavior that can be deployed in a virtualized infrastructure. In particular embodiments, a VNF 734 may include one or more virtual machines 732 that collectively provide specific functionalities (e.g., WAN optimization, virtual private network (VPN) termination, firewall operations, load-balancing operations, security functions, etc.). A VNF 734 running on platform logic 710 may provide the same functionality as traditional network components implemented through dedicated hardware. For example, a VNF 734 may include components to perform any suitable NFV workloads, such as virtualized evolved packet core (vEPC) components, mobility management entities (MMEs), 3rd Generation Partnership Project (3GPP) control and data plane components, etc.

SFC 736 is a group of VNFs 734 organized as a chain to perform a series of operations, such as network packet processing operations. Service function chaining may provide the ability to define an ordered list of network services (e.g., firewalls and load balancers) that are stitched together in the network to create a service chain.

A hypervisor 720 (also known as a virtual machine monitor) may comprise logic to create and run guest systems 722. The hypervisor 720 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 710. Services of hypervisor 720 may be provided by virtualizing in software or through hardware assisted resources that require minimal software intervention, or both. Multiple instances of a variety of guest operating systems may be managed by the hypervisor 720. Each platform 702 may have a separate instantiation of a hypervisor 720.

Hypervisor 720 may be a native or bare-metal hypervisor that runs directly on platform logic 710 to control the platform logic and manage the guest operating systems. Alternatively, hypervisor 720 may be a hosted hypervisor that runs on a host operating system and abstracts the guest operating systems from the host operating system. Hypervisor 720 may include a virtual switch 738 that may provide virtual switching and/or routing functions to virtual machines of guest systems 722. The virtual switch 738 may comprise a logical switching fabric that couples the vNICs of the virtual machines 732 to each other, thus creating a virtual network through which virtual machines may communicate with each other.

Virtual switch 738 may comprise a software element that is executed using components of platform logic 710. In various embodiments, hypervisor 720 may be in communication with any suitable entity (e.g., a SDN controller) which may cause hypervisor 720 to reconfigure the parameters of virtual switch 738 in response to changing conditions in platform 702 (e.g., the addition or deletion of virtual machines 732 or identification of optimizations that may be made to enhance performance of the platform).

Hypervisor 720 may also include resource allocation logic 744, which may include logic for determining allocation of platform resources based on the telemetry data (which may include stress information). Resource allocation logic 744 may also include logic for communicating with various components of platform logic 710 entities of platform 702A to implement such optimization, such as components of platform logic 710.

Any suitable logic may make one or more of these optimization decisions. For example, system management platform 706; resource allocation logic 744 of hypervisor 720 or other operating system; or other logic of computer platform 702A may be capable of making such decisions. In various embodiments, the system management platform 706 may receive telemetry data from and manage workload placement across multiple platforms 702. The system management platform 706 may communicate with hypervisors 720 (e.g., in an out-of-band manner) or other operating systems of the various platforms 702 to implement workload placements directed by the system management platform.

The elements of platform logic 710 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the computer platform 702A may be coupled together in any suitable manner such as through one or more networks 708. A network 708 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 8:
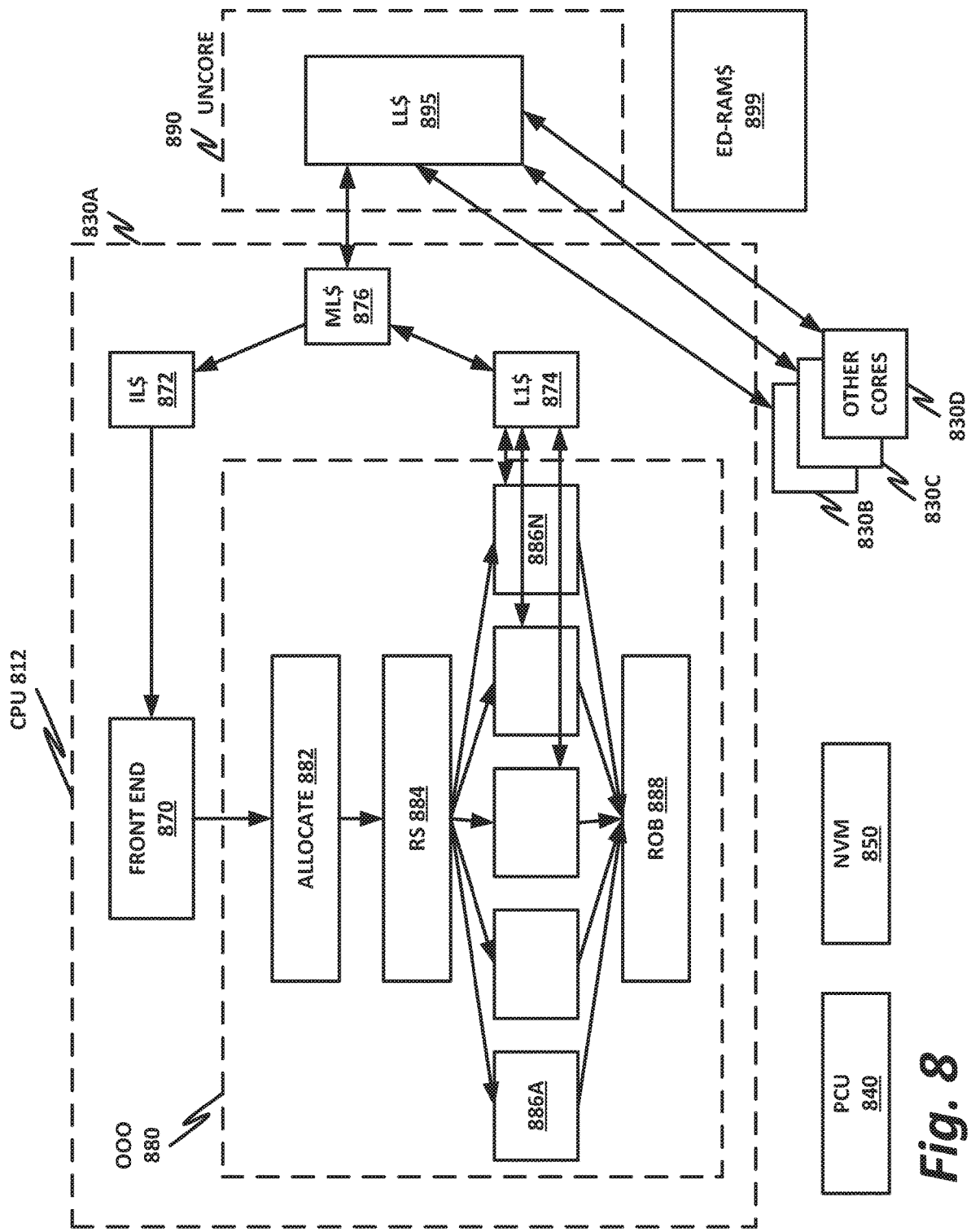
FIG. 8 is a block diagram of a central processing unit (CPU).

FIG. 8 illustrates a block diagram of a central processing unit (CPU) 812. Embodiments of CPU 812 disclosed herein may be adapted or configured to provide on-device dynamic safe browsing, according to the teachings of the present specification.

Although CPU 812 depicts a particular configuration, the cores and other components of CPU 812 may be arranged in any suitable manner. CPU 812 may comprise any processor or processing device, such as a microprocessor, an embedded processor, a digital signal processor (DSP), a network processor, an application processor, a co-processor, a system-on-a-chip (SoC), or other device to execute code. CPU 812, in the depicted embodiment, includes four processing elements (cores 830 in the depicted embodiment), which may include asymmetric processing elements or symmetric processing elements. However, CPU 812 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 830A includes an out-of-order processor that has a front end unit 870 used to fetch incoming instructions, perform various processing (e.g., caching, decoding, branch predicting, etc.) and passing instructions/operations along to an out-of-order (OOO) engine. The OOO engine performs further processing on decoded instructions.

A front end 870 may include a decode module coupled to fetch logic to decode fetched elements. Fetch logic, in one embodiment, includes individual sequencers associated with thread slots of cores 830. Usually, a core 830 is associated with a first ISA, which defines/specifies instructions executable on core 830. Often, machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 830, in one embodiment, recognize the same ISA (or a subset thereof). Alternatively, in a heterogeneous core environment, a decoder of one or more cores (e.g., core 830B) may recognize a second ISA (either a subset of the first ISA or a distinct ISA).

In the embodiment depicted, the OOO engine includes an allocate unit 882 to receive decoded instructions, which may be in the form of one or more micro-instructions or uops, from front end unit 870, and allocate them to appropriate resources such as registers and so forth. Next, the instructions are provided to a reservation station 884, which reserves resources and schedules them for execution on one of a plurality of execution units 886A-886N. Various types of execution units may be present, including, for example, arithmetic logic units (ALUs), load and store units, vector processing units (VPUs), and floating point execution units, among others. Results from these different execution units are provided to a reorder buffer (ROB) 888, which take unordered results and return them to correct program order.

In the embodiment depicted, both front end unit 870 and OOO engine 880 are coupled to different levels of a memory hierarchy. Specifically shown is an instruction level cache 872, that in turn couples to a mid-level cache 876, that in turn couples to a last level cache 895. In one embodiment, last level cache 895 is implemented in an on-chip (sometimes referred to as uncore) unit 890. Uncore 890 may communicate with system memory 899, which, in the illustrated embodiment, is implemented via embedded DRAM (eDRAM). The various execution units 886 within OOO engine 880 are in communication with a first level cache 874 that also is in communication with mid-level cache 876. Additional cores 830B-830D may couple to last level cache 895 as well.

In particular embodiments, uncore 890 may be in a voltage domain and/or a frequency domain that is separate from voltage domains and/or frequency domains of the cores. That is, uncore 890 may be powered by a supply voltage that is different from the supply voltages used to power the cores and/or may operate at a frequency that is different from the operating frequencies of the cores.

CPU 812 may also include a power control unit (PCU) 840. In various embodiments, PCU 840 may control the supply voltages and the operating frequencies applied to each of the cores (on a per-core basis) and to the uncore. PCU 840 may also instruct a core or uncore to enter an idle state (where no voltage and clock are supplied) when not performing a workload.

In various embodiments, PCU 840 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 840 may detect stress characteristics at any suitable interval.

In various embodiments, PCU 840 is a component that is discrete from the cores 830. In particular embodiments, PCU 840 runs at a clock frequency that is different from the clock frequencies used by cores 830. In some embodiments where the PCU is a microcontroller, PCU 840 executes instructions according to an ISA that is different from an ISA used by cores 830.

In various embodiments, CPU 812 may also include a nonvolatile memory 850 to store stress information (such as stress characteristics, incremental stress values, accumulated stress values, stress accumulation rates, or other stress information) associated with cores 830 or uncore 890, such that when power is lost, the stress information is maintained.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in an SoC, including a CPU package. An SoC represents an integrated circuit (IC) that integrates components of a computer or other electronic system into a single chip. Thus, for example, client devices 410 or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 510, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read-only memory (EPROM), an electrically erasable programmable read-only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 550 may store information in any suitable type of tangible, non-transitory storage medium (for example, RAM, ROM, FPGA, EPROM, electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 520 and storage 550, should be construed as being encompassed within the broad terms 'memory' and 'storage,' as appropriate. A non-transitory storage medium herein is expressly intended to include any non-transitory, special-purpose or programmable hardware configured to provide the disclosed operations, or to cause a processor such as processor 510 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, a computing apparatus, comprising: a hardware platform comprising a processor and a memory; software to access a network or internet resource according to a domain name; a network stack to provide network or internet access; and a virtual private network (VPN), configured to locally intercept a domain name-based access request, query a domain policy repository to determine whether the domain name should be blocked, and to query an external domain name system (DNS) server for an internet protocol (IP) address for the domain name and pass the request through the network stack if the domain name should not be blocked.

There is further disclosed an example, wherein the VPN is further configured to redirect the request to a "domain blocked" page if the domain should be blocked.

There is further disclosed an example, wherein the VPN is further configured to circumvent a secure network transaction protocol of the network stack if the domain should be blocked.

There is further disclosed an example, wherein the "domain blocked" page is a locally-hosted pseudo web page.

There is further disclosed an example, wherein the "domain blocked" page is a remote web page.

There is further disclosed an example, wherein the VPN is further configured to rewrite a response to the request to provide explanatory information about a secure communication error.

There is further disclosed an example, wherein determining whether the domain name should be blocked comprises querying user context and preferences.

There is further disclosed an example, wherein the domain policy repository is a local repository.

There is further disclosed an example, wherein the domain policy repository is a remote or third-party repository.

There is further disclosed an example, wherein querying the remote or third-party repository comprises providing a user-specific query.

There is further disclosed an example, wherein querying the remote or third-party repository comprises providing a subscriber-specific query.

There is further disclosed an example, wherein the apparatus is a mobile computing device.

There is further disclosed an example, wherein the apparatus is an Apple iOS or Google Android device.

There is further disclosed an example of one or more tangible, non-transitory, computer-readable mediums having stored thereon executable instructions to: provide access to a network or internet resource according to a domain name; provide a network stack to provide network or internet access; provide a local virtual private network (VPN) between an application space and the network stack, the VPN to receive a request packet directed to a domain name, query a domain policy repository to determine whether the domain name should be blocked, and to query a traditional domain name system (DNS) server for an internet protocol (IP) address mapped to the domain name only if the domain name should not be blocked; and after determining that the domain name is not to be blocked, pass the packet through the network stack.

There is further disclosed an example, wherein the VPN is further to redirect the request to a "domain blocked" page if the domain should be blocked.

There is further disclosed an example, wherein the VPN is further to circumvent a secure network transaction protocol of the network stack if the domain should be blocked.

There is further disclosed an example, wherein the "domain blocked" page is a locally-hosted pseudo web page.

There is further disclosed an example, wherein the "domain blocked" page is a remote web page.

There is further disclosed an example, wherein the VPN is further to rewrite a response to the request to provide explanatory information about a secure communication error.

There is further disclosed an example, wherein determining whether the domain name should be blocked comprises querying user context and preferences.

There is further disclosed an example, wherein the domain policy repository is a local repository.

There is further disclosed an example, wherein the domain policy repository is a remote or third-party repository.

There is further disclosed an example, wherein querying the remote or third-party repository comprises providing a user-specific query.

There is further disclosed an example, wherein querying the remote or third-party repository comprises providing a subscriber-specific query.

There is further disclosed an example of a method of providing a local common safe browsing, comprising: providing domain-name based resource access; providing a network stack; and providing a local virtual private network (VPN) between an application space and the network stack, the VPN to receive a request packet directed to a domain name, query a domain policy repository to determine whether the domain name should be blocked, and to query a domain name system (DNS) server for an internet protocol (IP) address mapped to the domain name only if the domain name should not be blocked; and passing the non-blocked packet through the network stack.

There is further disclosed an example, wherein the VPN is further to redirect the request to a "domain blocked" page if the domain should be blocked.

There is further disclosed an example, wherein the VPN is further to circumvent a secure network transaction protocol of the network stack if the domain should be blocked.

There is further disclosed an example, wherein the "domain blocked" page is a locally-hosted pseudo web page.

There is further disclosed an example, wherein the "domain blocked" page is a remote web page.

There is further disclosed an example, wherein the VPN is further to rewrite a response to the request to provide explanatory information about a secure communication error.

There is further disclosed an example, wherein determining whether the domain name should be blocked comprises querying user context and preferences.

There is further disclosed an example, wherein the domain policy repository is a local repository.

There is further disclosed an example, wherein the domain policy repository is a remote or third-party repository.

There is further disclosed an example, wherein querying the remote or third-party repository comprises providing a user-specific query.

There is further disclosed an example, wherein querying the remote or third-party repository comprises providing a subscriber-specific query.

What is claimed is:

1. A computing apparatus, comprising:
    a hardware platform comprising a processor and a memory; and
    instructions encoded within the memory to instruct the processor to:
        provide a network stack to provide network or internet access to a resource external to the computing apparatus according to a domain name; and
        provide a device-local caching domain name system (DNS) proxy server comprising a device-local virtual private network (VPN) server, the DNS proxy server to stand between the network stack and networked applications that are to access the external resource, and configured to locally intercept a domain name-based access request, query a domain policy repository to determine whether the domain name should be blocked, and to query an external DNS server for an internet protocol (IP) address for the domain name and pass the request through the network stack if the domain name should not be blocked.

2. The computing apparatus of claim 1, wherein the VPN server is further configured to redirect the request to a "domain blocked" page or IP address if a domain should be blocked.

3. The computing apparatus of claim 2, wherein the VPN server is further configured to provide explanatory information if the domain should be blocked and involves a secure network transaction protocol of the network stack.

4. The computing apparatus of claim 2, wherein the "domain blocked" page is a locally-hosted pseudo web page.

5. The computing apparatus of claim 2, wherein the "domain blocked" page is a remote web page.

6. The computing apparatus of claim 5, wherein the VPN server is further configured to rewrite a response to the request to provide explanatory information about a secure communication error.

7. The computing apparatus of claim 1, wherein determining whether the domain name should be blocked comprises making a per-query decision.

8. The computing apparatus of claim 1, wherein the domain policy repository is a local repository.

9. The computing apparatus of claim 1, wherein the domain policy repository is a remote or third-party repository.

10. The computing apparatus of claim 9, wherein querying the domain policy repository comprises providing a user-specific query.

11. The computing apparatus of claim 9, wherein querying the domain policy repository comprises providing a subscriber-specific query.

12. The computing apparatus of claim 10, wherein the apparatus is a mobile computing device.

13. The computing apparatus of claim 10, wherein the apparatus is an Apple iOS or Google Android device.

14. One or more tangible, non-transitory, computer-readable mediums having stored thereon executable instructions to:
    provide a device-local domain name system (DNS) proxy service to mediate network communications between a device-local application space and a device-local network stack, wherein the DNS proxy service comprises a device-local virtual private network (VPN) server, the VPN server to receive a request packet directed to a domain name, query a domain policy repository to determine whether the domain name should be blocked, and to query an external DNS server for an internet protocol (IP) address mapped to the domain name only if the domain name should not be blocked; and
    after determining that the domain name is not to be blocked, pass the packet through the network stack.

15. The one or more tangible, non-transitory computer-readable mediums of claim 14, wherein the VPN server is further to redirect the request packet to a "domain blocked" page if a domain should be blocked.

16. The one or more tangible, non-transitory computer-readable mediums of claim 15, wherein the VPN server is further to rewrite a response to the request packet to provide explanatory information about a secure communication error.

17. The one or more tangible, non-transitory computer-readable mediums of claim 14, wherein determining whether the domain name should be blocked comprises querying user context and preferences.

18. A method of providing local common safe browsing on a user device, comprising:
providing domain-name based resource access to a device-local address space;
providing a device-local network stack; and
providing a device-local caching domain name system (DNS) service, comprising a virtual private network (VPN) server, the VPN server to proxy traffic between an application space and the network stack, the VPN server to receive a request packet directed to a domain name, query a domain policy repository to determine whether the domain name should be blocked, and to query a domain name system (DNS) server for an internet protocol (IP) address mapped to the domain name only if the domain name should not be blocked; and
passing a non-blocked packet through the network stack.

19. The method of claim 18, wherein the VPN server is further to redirect the request packet to a "domain blocked" page if a domain should be blocked.

20. The method of claim 19, wherein the VPN server is further to circumvent a secure network transaction protocol of the network stack if the domain should be blocked.

* * * * *